(12) United States Patent
Shah (10) Patent No.: US 6,405,924 B1
(45) Date of Patent: Jun. 18, 2002

(54) INVENTORY CONTROL SYSTEM AND METHOD

(75) Inventor: Pragnesh S. Shah, Lake Hiawatha, NJ (US)

(73) Assignee: Insta-Trek Corporation, Fairfield, CT (US)

( * ) Notice: Subject to any disclaimer, the term of this patent is extended or adjusted under 35 U.S.C. 154(b) by 0 days.

(21) Appl. No.: 09/493,604

(22) Filed: Jan. 28, 2000

(51) Int. Cl.[7] ................................................. G06K 5/04
(52) U.S. Cl. ........................... 235/462.08; 235/462.09; 235/462.1; 235/385
(58) Field of Search ................................ 235/375, 378, 235/462, 472.02, 461, 385, 470, 492, 493, 462.14, 439

(56) References Cited

U.S. PATENT DOCUMENTS

| | | | |
|---|---|---|---|
| 4,872,113 A | 10/1989 | Dinerstein | 364/401 |
| 5,237,163 A | 8/1993 | Collins, Jr. et al. | 235/472 |
| 5,444,226 A | 8/1995 | Collins, Jr. | 235/462 |
| 6,234,394 B1 * | 9/2000 | Kahn et al. | 235/462.46 |
| 6,253,190 B1 * | 6/2001 | Sutherland | 235/383 X |

FOREIGN PATENT DOCUMENTS

| | | |
|---|---|---|
| EP | 0700011 | 4/1998 |
| JP | 4239390 | 8/1992 |
| JP | 4323785 | 11/1992 |
| JP | 6068291 | 3/1994 |
| JP | 8050628 | 2/1996 |
| JP | 02000289810 A * | 4/1999 |

* cited by examiner

Primary Examiner—Michael G. Lee
Assistant Examiner—Daniel Walsh
(74) Attorney, Agent, or Firm—Robert R. Deleault, Esq.; Mesmer & Delault, PLLC (57) ABSTRACT

An inventory use recording system and method having an optical reader module for scanning component bar codes of an inventory batch having serialized bar codes, a controller module for storing at least a first tag representation and a second tag representation where the second tag representation is a tag representation from a next available component in the inventory batch after a predetermined time period where a quantity of the components have been withdrawn from the inventory batch, and a display module for displaying inventory use.

31 Claims, 6 Drawing Sheets

INVENTORY CONTROL SYSTEM AND METHOD

BACKGROUND OF THE INVENTION

1. Field of the Invention

The present invention relates to the field of inventory control. Particularly, the present invention relates to the field of inventory control using barcodes on individual inventory items. More particularly, the present invention relates to the field of inventory control where usage of the inventory items during predetermined time periods are tracked and recorded by performing an initial barcode scan on a designated component in a batch and subsequently performing a barcode scan on the next available component in a batch at the end of a predetermined time period.

2. Description of the Prior Art

Various laser scanning systems have been developed for many processing industries to read bar code symbols, which uniquely identify an object to be processed, and to decode the symbol to a multiple digit representation for recordkeeping and inventory control purposes. For example, blood banks have begun to identify blood bags with bar code symbols to facilitate processing. The magazine distribution industry widely distributes magazines on a consignment basis and therefore the need exists for accurately and quickly tallying the returned magazines for credit validation. Similarly, the record and tape industry requires accurate inventory information of its sold and returned products.

It is quite common in the supermarket industry to utilize a checkout counter scanning system which scans a barcode on the supermarket products and transmits that information to both a cash register which displays the price of the product and a central computer which stores information concerning the product. Typically, each product has a Uniform Product Code (UPC) which consists of two sets of codes/numbers. The first grouping of codes is manufacturer specific and the second grouping of codes represents a particular product in the specific manufacturer's product line. These systems are typically used in point-of-service transactions. They are used by many retailers not only to keep track of inventory levels as each item is scanned but also to measure the scanning performance of their checkout personnel, which is typically measured in items scanned per minute.

The barcode symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like.

There are several laser-scanning systems of this general type currently in use. For example, there are point-of-sale or deck scanners which are large, massive and stationary installations that are built into an immovable structure such as a supermarket counter. Other systems include contact-type and non-contact-type wand or pen bar code readers, which are positioned on or near the symbol, and then manually dragged across the symbol. Still other laser scanning systems have recently been designed which can be hand-held. In addition, there are scanner systems for providing real-time performance feedback, for scanning a plurality of barcode labels appearing within the field of view of the scanner and for interrelating scanner data from a supermarket checkout counter with demographic and/or economic data concerning individual customers. However, all of the current scanning systems require that each item be scanned in order to properly track inventory levels and usage.

U.S. Pat. No. 5,237,163 (1993, Collins et al.) discloses a method for processing the reading of barcode tags or labels in which a barcode scanner reads a plurality of barcode tags in the field of view of the scanner while in a stationary position generating tag representation for each tag read. The steps include storing the first tag representation, comparing each succeeding tag representation with the first tag representation and generating a count representing the number of times the same tag read was read for use in processing the barcode tags in the minimum amount of time. A drawback of this device requires that each item be scanned in order to properly track inventory levels and usage.

U.S. Pat. No. 5,444,226 (1995, Collins) discloses a feedback system for an optical scanner which provides scanning rate information to an operator during scanning. The feedback system includes a controller for determining scanning rate information during scanning and a plurality of lights controlled by the controller which provides the scanning rate information to an operator during scanning. The system also includes a shift register coupled between the controller and the indicator lights, and a speaker for providing an aural indication of successful and unsuccessful scanning events during scanning. Again, a draw back of this device requires that each item be scanned in order to provide the user with scanning rate information and to properly track inventory levels and usage.

U.S. Pat. No. 4,872,113 (1989, Dinerstein) discloses a system for interrelating scanner data from a supermarket checkout counter with demographic and/or economic data concerning individual customers to generate a demographic and economic analysis of sales with respect to specific supermarket items. The computer keeps track of all items purchased by the individuals, preferably by the entry of item data through a barcode scanner at the checkout counter. This, like the other prior art, requires that each item be scanned to provide a more reliable interrelationship of the demographic and economic data concerning individual customers and to properly track inventory levels and usage.

Therefore what is needed is an inventory recording system that does not require recording of product characteristics for each product sold or withdrawn from inventory. What is further needed is an inventory recording system that allows recording of inventory usage by recording an initial item in each batch of like items and then recording a next available item in a particular batch sometime thereafter regardless of the number of items withdrawn during the interim time. What is still further needed is an inventory recording system that provides inventory usage by using barcodes on inventory items that have a portion of the barcode individually serialized and that are arranged in either increasing or decreasing numerical order.

SUMMARY OF THE INVENTION

It is an object of the present invention to provide an inventory barcode recording system that does not require recording of product characteristics for each product sold or withdrawn from inventory. It is a further object of the present invention to provide an inventory barcode recording system that allows recording of an initial item in each batch of like items, the recording of the next available item in a particular batch after a period of time regardless of the number of items withdrawn from the particular batch, and the determination of the number of items withdrawn from that particular batch that occurred during that time period. It is yet a further object of the present invention to provide an inventory barcode recording system that provides this information by using barcodes on inventory items that have a portion of the barcode individually serialized and that are arranged in either increasing or decreasing numerical order.

The present invention achieves these and other objectives by providing an inventory system and methodology that incorporates the use of serialized barcodes on like items, a scanning device for scanning the barcode of a predetermined item in a batch, a processor circuit for recording the barcode data into memory, and a data display device for displaying reports on the usage of various inventory items. The scanning device may be hand-held or stationary. The system may be made up of multiple components or it may be incorporated into a single unit. The scanning device should be capable of reading various symbologies such as UPC/EAN/JAN, Bookland EAN, Code 128, Code 39, Code 93, Interleave, Discrete, Codabar, 1205, and MSI Plessey to name a few. The data display device may be any useable screen display capable of displaying computerized data. A printing device may also be attached to provide hard-copy reports of inventory usage.

The inventory system methodology relies on each inventory item in a given batch having serialized barcodes and each item in a batch of like items being arranged in either increasing or decreasing serial numbers. The barcodes must be divided into at least two number segments, one for the batch number of the item and one for the serial number. Preferably, a third grouping representing the model number is also used. The items must be arranged such that the serial numbers of the individual items having the same model number are in sequential order. It is not important that the starting serial number be zero or one so long as the total number of items having the same model number are in proper order. By having the first item's serial number equal to zero or one, it simplifies recording the quantity of items of a particular model number. For ease of explanation, we shall call this Method 1. This is accomplished by simply recording the serial number of the last item to determine the total number of items. For instance, if all serialized components begin with zero, the quantity of items in a batch is equal to the serial number of the last component plus one. Specifically, if the last item has a serial number of 299, the total number of items is equal to 300. If all serialized components begin with one, the quantity of items in a batch is equal to the serial number of the last component.

If the serial numbers do not begin with zero, then recording the first item and the last item in the batch are needed to determine the quantity of items in that batch. For ease of explanation, we shall call this Method 2. Either way, inventory usage of a particular component may be easily determined without having to scan/record each item when it is withdrawn from inventory. After a period of time, the next available item in inventory is scanned. Unlike prior art inventory systems, the present invention does not require scanning of each item withdrawn from inventory. The present invention does not increase a counter stored in memory for a particular item by one each time such item is scanned.

Because each component is serialized and arranged in order of increasing or decreasing serial number, the quantity of a particular item withdrawn during a given period of time can be determined. Under both Methods 1 and 2, the next available item in a collection of like items is scanned. Under Method 1, the serial number of the next available item represents the number of items that have been previously withdrawn from that particular batch. Under Method 2, the serial number of the next available item is subtracted from the serial number of the initial item scanned. The difference between the serial numbers plus one equals the number of items that have been withdrawn. By storing the barcodes and time/date each time scanning is performed, the present system can provide inventory withdrawal quantities for each interim time period in addition to total inventory usage for a particular batch. Thus, the present invention does not require recording or scanning of each item in order to determine the total number of items withdrawn from inventory during a given period of time. The present invention provides considerable savings in time and costs especially for establishments that do not have a "point-of-sale" type system. It is especially useful for tracking inventory use when personnel changes occur such as work shift changes.

A third method, Method 3, is also possible. Method 3 also requires that the individual pieces of a particular inventory item have serialized bar codes as well as a set number of pieces in each batch. This method allows the user to scan any piece in a particular batch when a new batch is opened without having to be concerned about scanning the bar code of the first or last serialized piece. In this method, the user must manually enter the price per piece. The quantity of each batch may or may not need to be entered depending on the serialization system used. In fixed-batch cost systems, the price of each item also determines the quantity of items in the batch.

The present invention is particularly useful for instant lottery ticket sales, as there is currently no automated counting system for recording such sales. The large lottery ticket machines that are used for the "numbers" games are used only for activating the different instant-ticket lottery games. Each game generally has a sufficient number of instant-game tickets to last several days, if not weeks. Once the individual store owners and operators activate a new game, the only way for them to keep track of the number of instant tickets sold per game is to do a manual count of each game. Because lottery sales is a cash business and accountability is important to avert theft, store owners or managers manually do a final tally of the day or tallies after each workshift change. This is done every day for all the instant game tickets sold during that day. For one instant game, this would not present much of a problem. However, each State introduces a large variety of instant lottery games in order to appeal to a larger customer base. On any given day, a State lottery commission may have as many as thirty to fifty different instant lottery games in progress. Doing a daily tally of the number of tickets sold for each game is time consuming. In establishments that are open for twenty-four hours or where shift changes occur during the day due to personnel changes, a tally must be performed for each game for each shift. Because instant lottery ticket sales is a cash business with a very low markup, it is important that not only daily but shift tallies be performed to protect against theft. This manual counting has become a serious hassle for storeowners and managers.

The present invention reduces the time to count the daily and workshift sales of all of these various games. Each ticket is serialized, each game is given a model/part number, and each printing run is given a batch number so that the State authorities, particularly the sweepstakes commissions of the various States, can determine if and when winning tickets may be counterfeit. By scanning the last ticket in a game under Method 1, the game number, batch number and total number of tickets in the game is stored by the present invention. At the end of the day or workshift, one simply scans the next available ticket for each particular game. From the bar code data, the tally is automatically calculated by retrieving the previously scanned item information and performing the necessary data manipulation. A report is then generated listing all games and the number of tickets of each instant lottery game sold. This serialized bar code system is not limited to instant-game lottery tickets. It is also useful for tracking inventory usage in warehouse environments, by wholesalers and by anyone or any company wishing to easily determine inventory usage. As mentioned earlier, any system that serializes each piece of inventory may be set up similar to Methods 1, 2 or 3.

Additional advantages and embodiments of the present invention will be set forth in part in the detailed description, which follows, and in part will be apparent from the description, or may be learned by practice of the invention. It is understood that the foregoing general description and the following detailed description are exemplary and explanatory and are intended to provide further explanation of the invention as claimed.

DETAILED DESCRIPTION OF THE PREFERRED EMBODIMENT

The following detailed description of the invention is provided to aid those skilled in the art in practicing the present invention, however, it should not be construed to unduly limit the present invention. Variations and modifications in the disclosed embodiments may be made by those of ordinary skill in the art without departing from the scope of the present invention. With regard to the drawings, it will be understood that while preferred embodiments of the invention have been illustrated and described, the invention is not limited to such embodiments. Changes and additions may be made without departing from the spirit of the invention.

The preferred embodiment of the present invention is illustrated in FIGS. 1–7. It is important that the present invention to work as described, each piece contained in a particular batch of an inventory item must have a serialized bar code. Further, each piece must be arranged in increasing or decreasing serial number order for withdrawal from inventory.

Figure 1:
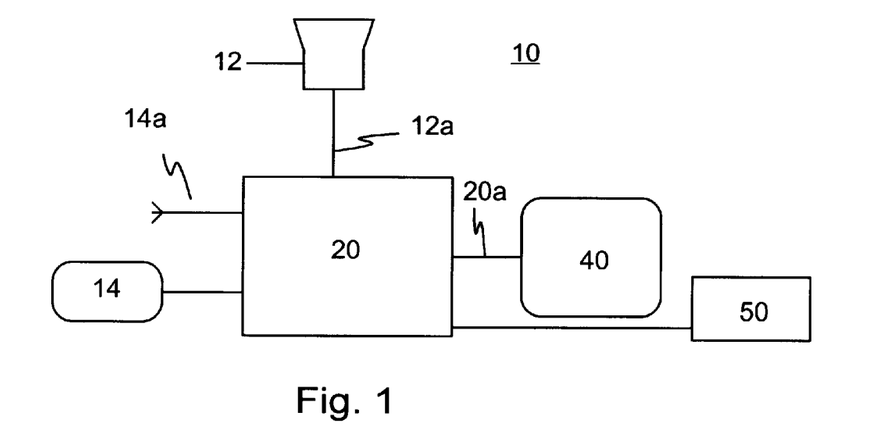
FIG. 1 is a simplified block diagram of a computerized system in which the present invention may be used.

FIG. 1 shows an inventory usage system 10. Inventory usage system 10 includes an optical reader 12 such as a scanner for reading barcodes, a controller device 20 and a data display component 40. Controller device 20 receives a user input signal 14a and responds to user input signal 14a by communicating with optical reader 12 through reader signal 12a and by communicating with display component 40 through display signal 20a. System 10 may further include a printer device 50.

Figure 2:
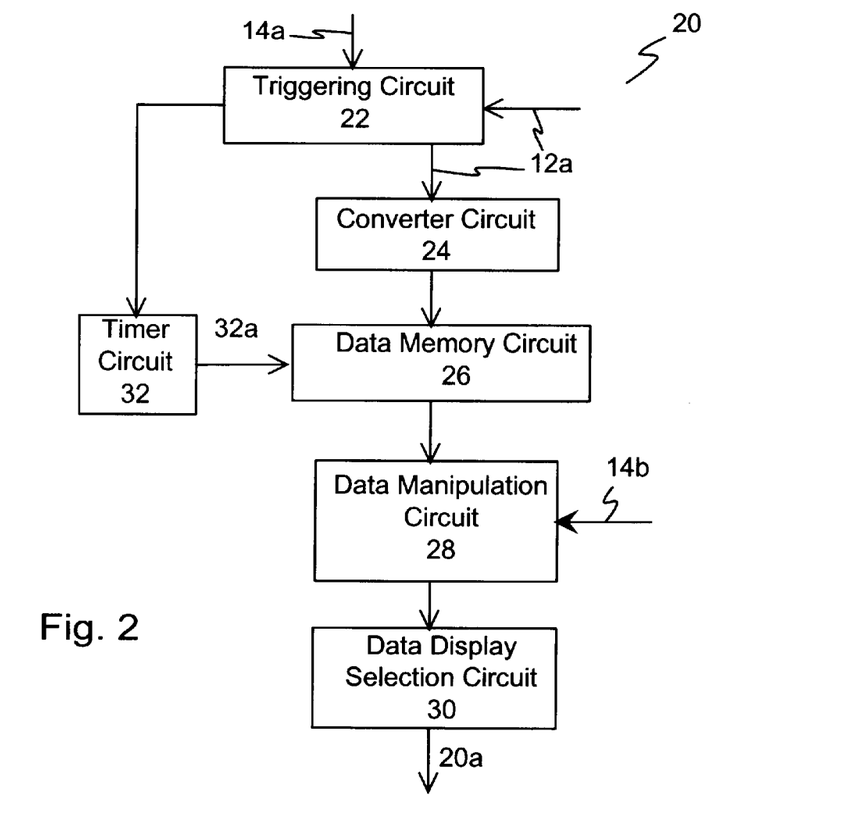
FIG. 2 is a block diagram of the preferred embodiment showing the various circuits of the controller module.

Turning to FIG. 2, controller device 20 includes a triggering circuit 22, a converter circuit 24, a data memory circuit 26, a data manipulation circuit 28, a data display selection circuit 30, and a timer circuit 32. Triggering circuit 22 triggers optical reader 12 to begin reading a barcode label or tag on an inventory item in response to user input signal 14a. Optical reader 12 generates electrical signals, shown as reader signal 12a, in response to receiving the reflected tag representation in a manner that is well known in the art.

The reader signal 12a is sent to converter circuit 24. Converter circuit 24 receives reader signal 12a from optical reader 12 and decodes reader signal 12a into data representing the scanned item's model number, batch number and serial number. Data memory circuit 26 stores the tag representations along with a date stamp received as date stamp signal 32a, which is received from timer circuit 32 when triggering circuit 22 is enabled. The information in data memory circuit 26 is stored for use and retrieval by the data manipulation circuit 28. Data manipulation circuit 28 sends data to the data display selection circuit 30, which in turn sends the data as display signal 20a to display component 40 for display of specific data in response to user input signal 14b.

The present invention may be embodied as separate components. For instance, the controller circuit 20 may be a desktop or laptop computer, the optical reader 12 may be a portable barcode scanner, and the display circuit 40 may be a display monitor and/or printer. The separate components may also be incorporated into a single, self-contained, portable unit. For ease of handling and use, a single, self-contained, portable unit is preferred. Such a preferred device is a palm-size, barcode scan enabled terminal, developed by and available from Symbol Technologies, Inc., Holtsville, N.Y. (Cat. No. SPT 1500), containing specialized instructions for effecting the methodology of the present invention. The specialized instructions are computer program codes preferably written in a computer language known as Satellite Forms software available from Puma Technologies Services, Inc., Scotts Valley, Calif.

Figure 3:
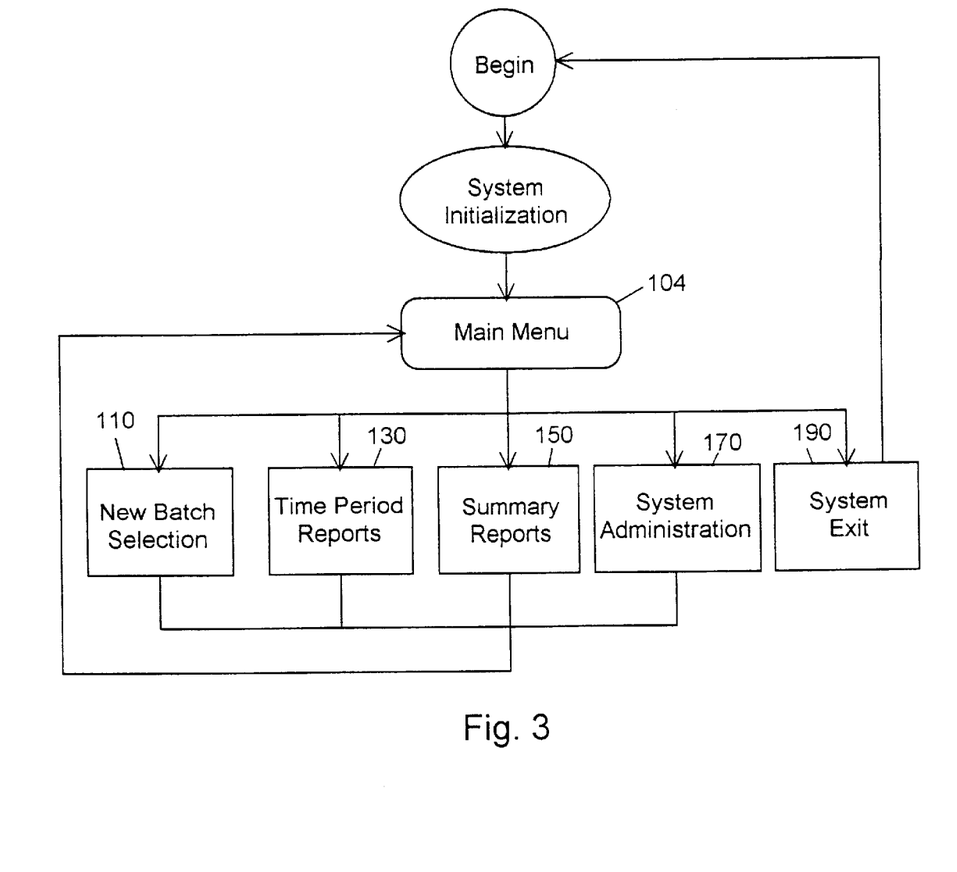
FIG. 3 is a block diagram of the preferred embodiment of the present invention illustrating initialization and execution flow of five selective events.

FIG. 3 shows a block diagram representing the execution methodology of various tasks of the preferred embodiment. To use the present invention, an operator begins the process by powering up system 10 initializing the inventory usage system 10. After initialization, the operator provides input signal 14a by selecting an operation at step 104.

The operator may select the following available operations; new batch activation 110, time period reporting 130, summary reporting 150, system administration 170, and system exit 190. System exit 190 allows the operator to end system operation.

Figure 4:
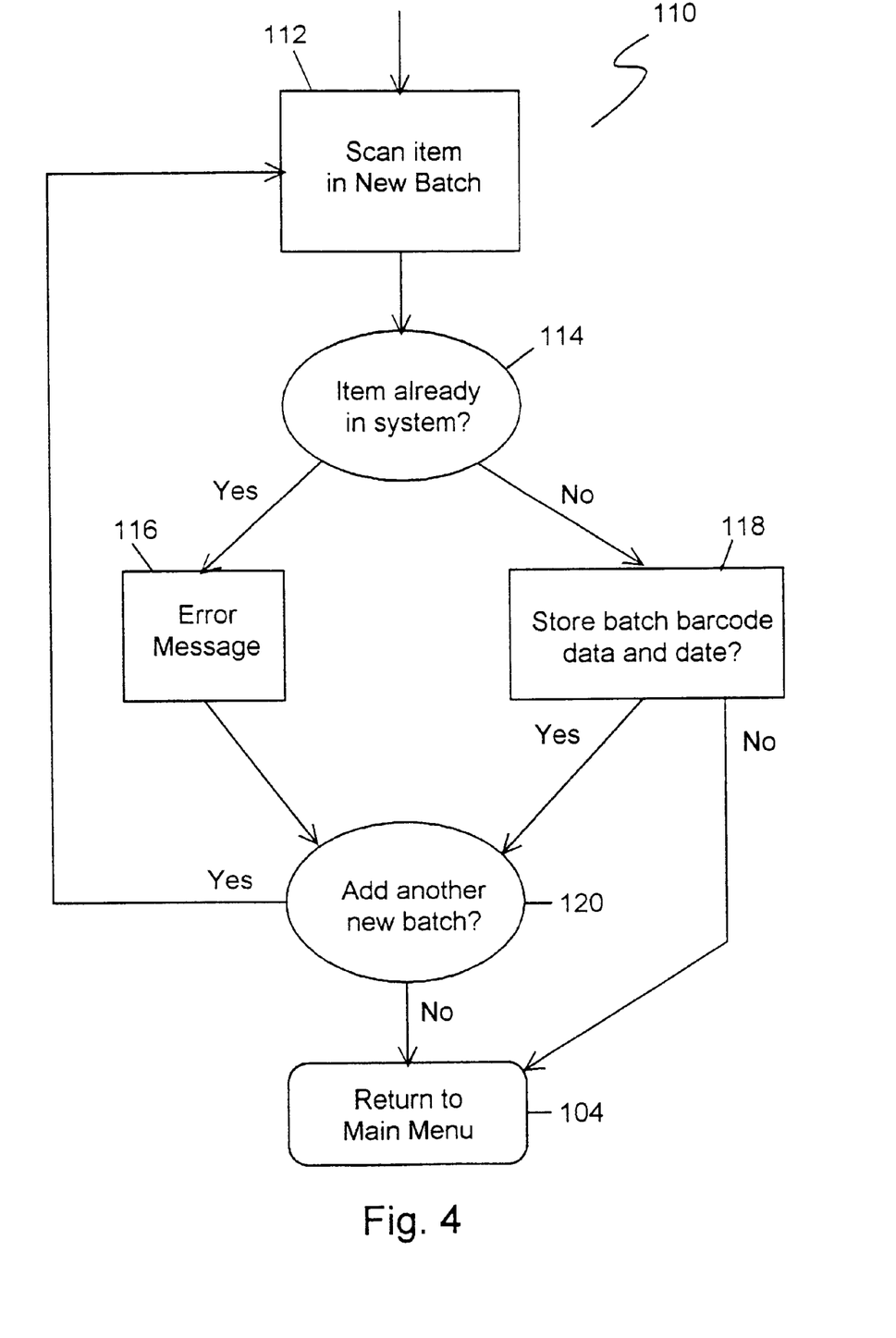
FIG. 4 is a block diagram of the preferred embodiment of the present invention showing the execution flow of the first selective event.

New batch activation 110 is illustrated in FIG. 4. Under new batch activation 110, the operator is instructed at step 112 to scan the last item in the new, unactivated batch. As previously described, this is the preferred method (Method 1) for use with inventory items having a fixed dollar-value per batch such as instantgame lottery tickets. The last serialized item, the first serialized item or both may need to be scanned to properly activate a new batch under the other two methods described, or, in the alternative, to scan any item in the batch followed by the user inputting the per-item price. As reader signal 12a is provided to controller circuit 20, the batch data is compared at step 114 to the data in the data memory circuit 26. If the item is already activated in the system, an error message is issued at step 116. If the item is new, the batch is activated in the system by storing the batch bar code data and date at step 118. A request is issued to the operator at step 120 whether another batch must be activated. If the operator answers in the affirmative, the loop continues until the operator selects to exit to the main menu at step 120.

Figure 5:
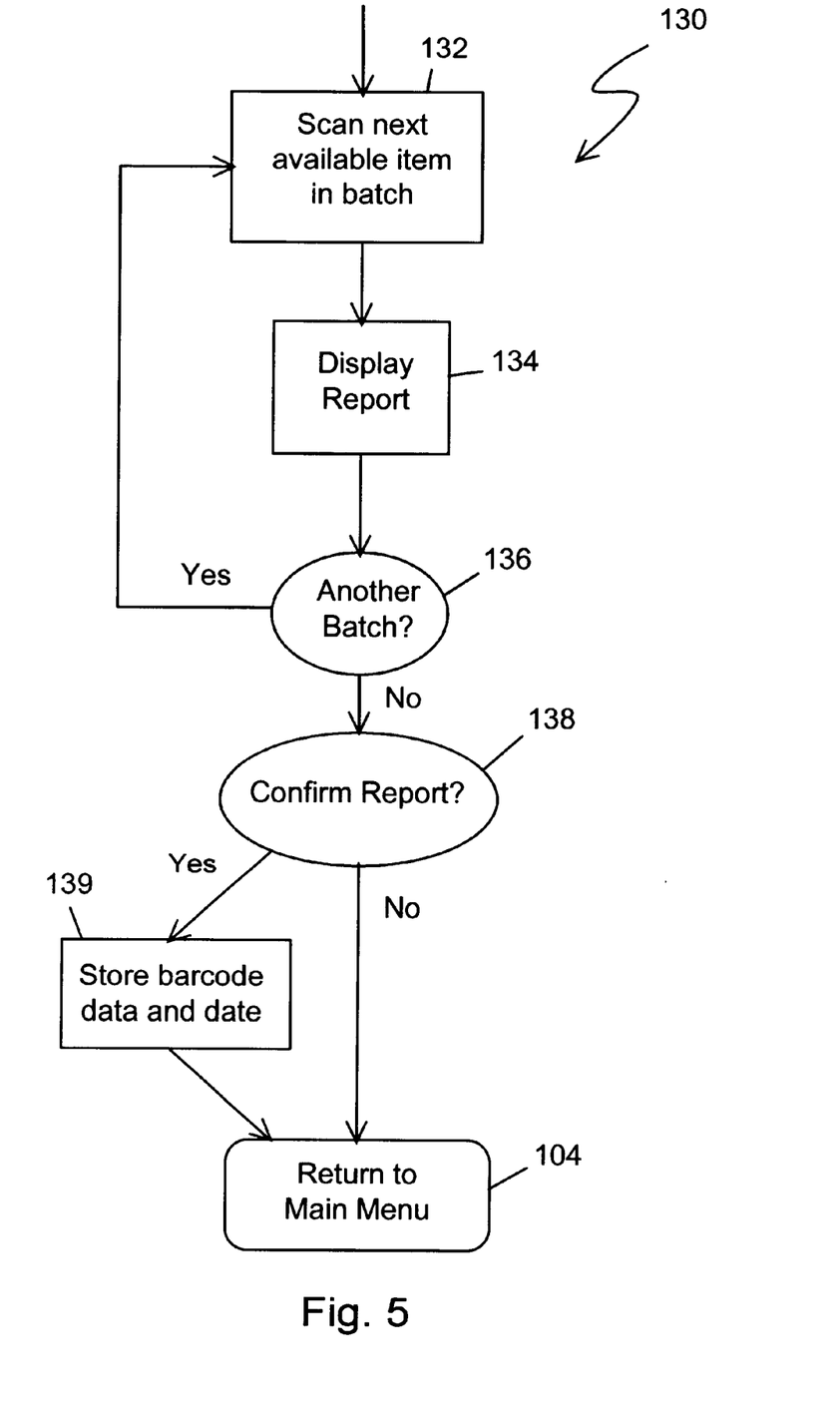
FIG. 5 is a block diagram of the preferred embodiment of the present invention showing the execution flow of the second selective event.

FIG. 5 illustrates a simplified version of the methodology when the operator selects time period reporting 130. The operator is instructed at step 132 to scan the next available item in a batch. As reader signal 12a is provided to controller circuit 20, the batch data is compared to the data in the data memory circuit 26 and a report on the usage is presented to the operator at step 134. At step 136, the operator is given the option of getting a usage report on another item. The operator continues to loop through the scan request and report display routine so long as the operator keeps choosing to get a report on another item. When the operator is done, the operator is requested to confirm the report at step 138. If the operator confirms the report, each item's bar code information along with a date and time stamp is stored in the data memory circuit 26 at step 139 before returning to step 104. If the operator does not want to confirm the report, the bar code data is not stored and the operator is returned to step 104. This option allows the operator to review usage data during a given time period such as the day or workshift without closing the time period and recording the information as a time-period final tally, for example as a final day or workshift tally.

Figure 6:
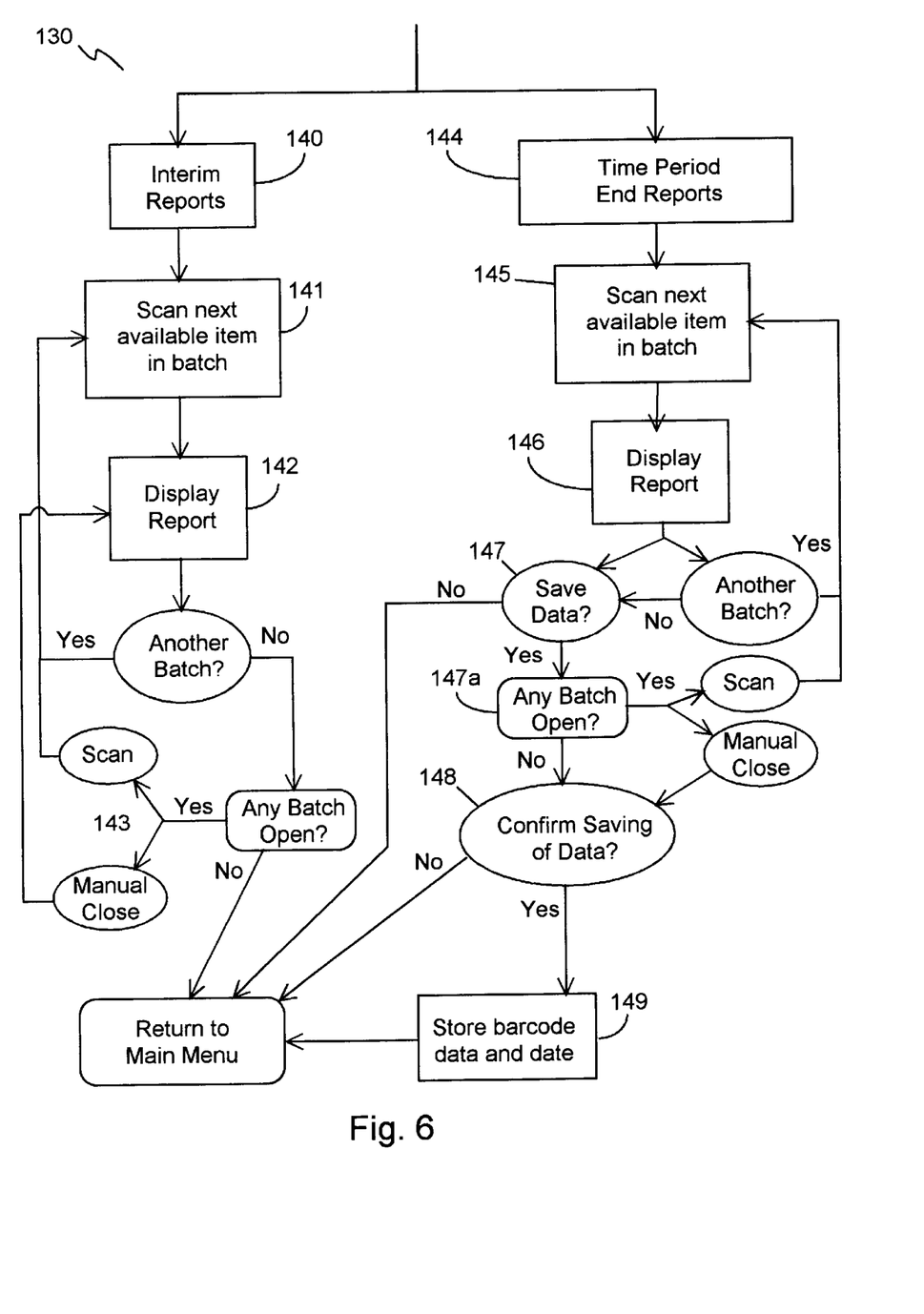
FIG. 6 is a block diagram of the preferred embodiment of the present invention showing the execution flow of the third selective event.

As a means for avoiding possible inadvertent closing of the time period previously described and illustrated in FIG. 5, a preferred embodiment is to divide time period reports 130 into two separate options as illustrated in FIG. 6. FIG. 6 shows two available options as interim reports 140 and time-period end reports 144. If interim reports 140 is chosen, the user is instructed to scan the next available item in a batch at step 141 and the data is displayed at display report 142 as the item is scanned. If the user chooses not to scan another batch, the system checks for any open batches that were not scanned and alerts the user at step 143. The available options are to scan the next available ticket in the open and unscanned batch or to manually close the batch. After scanning or manually closing any unscanned batches, the user is returned to display report 142 to view the data for all of the open batches. The user may then return to main menu 104. If time-period end reports 144 is chosen, again the user is instructed to scan the next available item in each batch at step 145 and a time-period end report is displayed at display report 146. After scanning and reviewing all of the open batches, the user selects to either save the time-period end data values at step 147 or to return to main menu 104. If the user selects to save the time-period end data values, the system checks for any open batches that were not scanned and alerts the user at step 147a. The available options are to scan the next available ticket in the open and unscanned batches or to manually close the batches. The user must confirm the data-saving action at step 148. Confirming the data-saving action at step 148 closes the time period and stores the bar code data and date at step 149, a new time period data collection session begins and the user returns to main menu 104.

Figure 7:
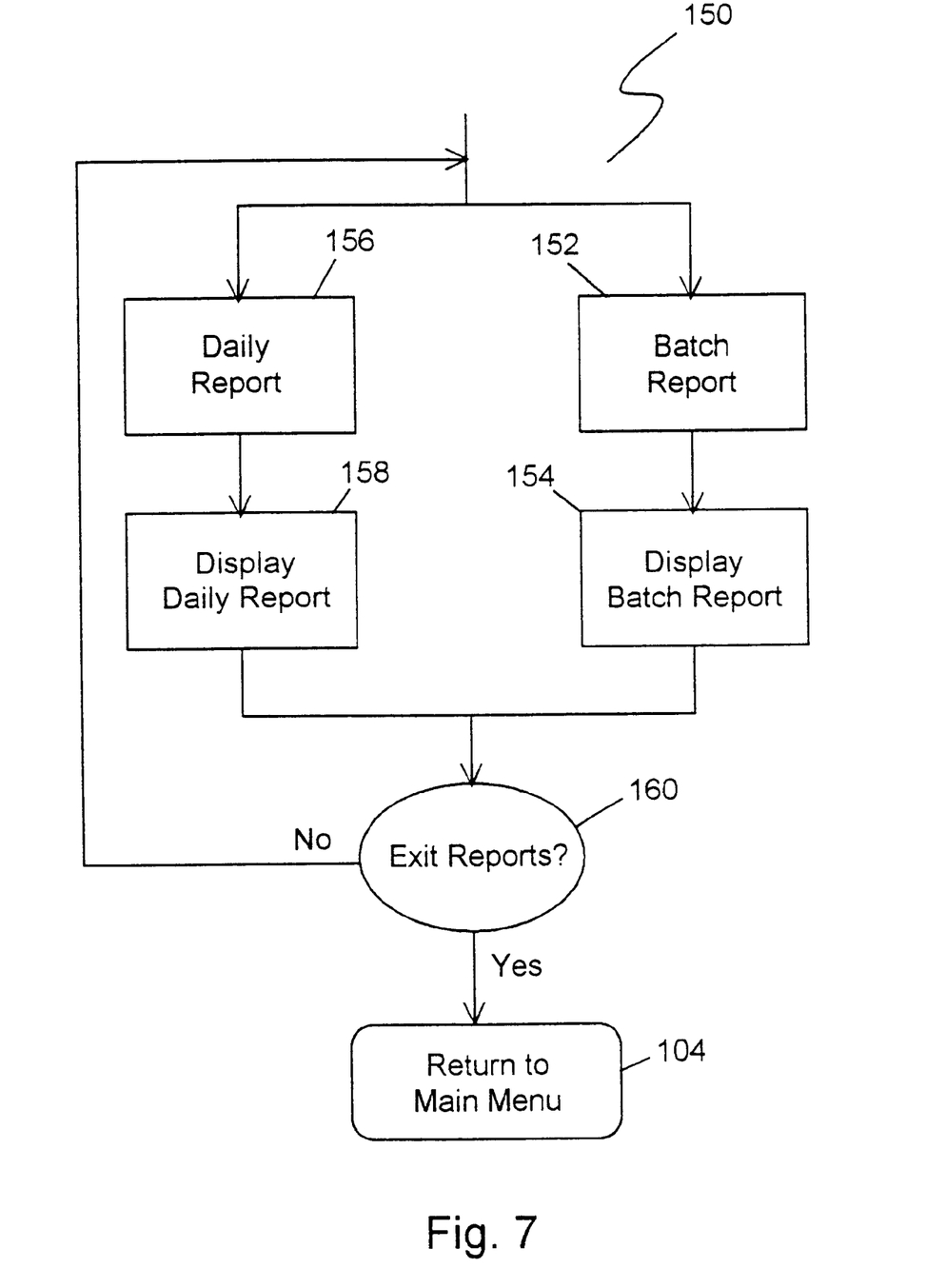
FIG. 7 is a block diagram of the preferred embodiment of the present invention showing the execution flow of the fourth selective event.

FIG. 7 illustrates the methodology when the operator selects summary reporting 150. Under summary reporting 150, the operator may select either daily reporting 156 or batch reporting 152. Under daily reporting 156, the operator is requested to select a date of interest and a report for that date is displayed at display daily report 158. If an invalid date is selected, an error message is displayed. Under batch reporting 152, the operator is requested to select a batch of interest and a report for that batch is displayed at display batch report 154. If an invalid batch is selected, an error message is displayed. The operator may continue to loop through displaying reports until the operator decides to exit summary reporting 150 as in step 160.

FIG. 8 illustrates the methodology when the operator selects system administration 170. Under system administration 170, the operator may select either registration 172, initial setup 178, system control 182, or exit system administration 186. Registration 172 is performed only once and the operator is requested to enter an authorization code at step 174. If the authorization code is valid, registration 172 is deactivated at step 176. Initial step 178 is provided for entering batch data for batches already in use when inventory system 10 is used for the first time. At step 180, the operator may select to either scan the next available item in each batch already in use or to manually enter the data. System control 182 allows the operator to select at step 184 the type of serialization the operator's inventory system is using, increasing or decreasing serialization. If the operator inadvertently selected system administration 180, the operator may exit at step 186 and return to step 104.

The following example illustrates the methodology of the present invention. A shipment containing several batches of consumable parts is received from a supplier. Each batch consists of a plurality of parts, each part bearing a bar code. The bar code has three number groupings such as 146-037063-000. It should be understood that the groupings are separated by hyphens for ease of explanation and understanding. The first grouping, 146, represents the part number portion. The second grouping, 037063, represents the batch number portion. The third grouping, 000, represents the serial number portion. Each part in a grouping of like items has the same batch number portion and part number portion as the others in the grouping. However, each part has a different serial number in the serial number portion. All the parts in a grouping are serialized and arranged in sequential order. The batch number or part number may be coded to represent the price per item.

For ease of illustration, we shall assume the bar-coded parts are serialized as in Method 1 previously explained. That is, the first item in each part number has a serial number of zero. When a particular shipment is required to be used, an individual batch is activated by scanning the last item in the batch. This initializes it into the system of the present invention. The part number and the batch number contains indicia for the parts such as pricing and description. The serial number of the last item represents the total number plus one of parts of like part number and batch number. If the last item in a particular grouping has the number 146-037063-299, the grouping of like items (146-037063) contains a total of 300 parts (299+1). Now if the operator activates twenty batches from a shipment of fifty batches, the operator will be able to easily determine how many parts were used including their dollar value total at the end of a given time period such as at the end of the day or workshift.

The operator does this by simply scanning the next available item in each batch at the end of the day or workshift. The last serial number scanned will become the beginning number for the next time period. The system is programmed to know when the batch is activated and when the time period is the first time period after activation. The system also provides the operator with a report. An end-of-day or final report containing various details like time, date, operator, usage, price, etc. may also be reported. It is important to note that the operator is not scanning each individual part. Yet, the operator is getting an accurate usage count based on a previous end-of-day scan to a current end-of-day scan.

Although the preferred embodiment has been described, it should be understood that the methodology of the present invention may be provided on computer readable medium for transfer to and use on various computer systems where each system has a bar code scanner attached.

What is claimed is:

1. An inventory usage tracking system comprising:

an optical reader module capable of scanning a component barcode of a designated component of a component batch and of providing a reader module signal representing said component barcode wherein said component barcode includes at least a batch number portion and a serial number portion and wherein a plurality of similar components in said component batch are arranged in numerical order according to said serial number portion;

a controller module coupled to said reader module, said controller module comprising a triggering circuit capable of activating said reader module, a converter circuit coupled to said triggering circuit and said reader module for receiving said reader module signal, a data memory circuit coupled to said converter circuit, a data manipulation circuit coupled to said data memory circuit capable of performing various data manipulations in response to an operator input signal, and a data display circuit coupled to said data manipulation circuit; and a component usage feedback module coupled to said controller module capable of displaying said data manipulations;

wherein said inventory system provides a usage quantity of said component batch by obtaining barcode information for a beginning item in said component batch and obtaining barcode information for the next available item in said component batch after a predetermined time of item usage or withdrawal of items from said component batch.

2. The inventory system of claim 1 wherein said feedback module includes a display screen.

3. The inventory system of claim 1 wherein said feedback module includes a printer output.

4. The inventory system of claim 1 wherein said reader module is a handheld scanner.

5. The inventory system of claim 1 further including a data recording module for recording said usage quantity of said item.

6. The inventory system of claim 1 wherein said reader module, said controller module and said feedback module are combined into a single housing unit.

7. The inventory system of claim 6 wherein said single housing unit is a hand-held unit.

8. The inventory system of claim 1 wherein said component barcode further includes a part number portion.

9. A method for measuring the quantity of components withdrawn from a component batch during a predetermined time period using a barcode scanner, said method comprising:

activating a component batch by scanning a component barcode from a designated component in a component batch containing a plurality of similar components wherein said component barcode includes at least a batch number portion and a serial number portion and wherein said plurality of similar components in said component batch are arranged in numerical order according to said serial number portion;

storing said at least batch number portion and said serial number portion of said component barcode;

scanning a component barcode of a next remaining component in said component batch after a predetermined usage time period;

calculating a usage quantity of said component by the difference between said serial number portion of a designated component and said serial number portion of a next remaining component; and displaying said usage quantity of said component for said predetermined time period.

10. The method of claim 9 wherein said storing step further includes storing the price of said component.

11. The method of claim 9 wherein said storing step further includes storing the date of said activating step.

12. The method of claim 9 wherein said scanning step further includes storing said component barcode of said next remaining component.

13. The method of claim 12 further comprising determining when said component batch is empty.

14. A computer program product comprising:

a computer usable medium having computer readable program code means embodied therein for determining the quantity of components withdrawn from a component batch during a predetermined time period using a scanner coupled to a computer, said computer readable program code means comprising:

scanner activating program code means for causing said computer to effect activating said scanner and to effect collecting barcode information from a designated component barcode at the beginning of a component batch and for causing the computer to effect collecting barcode information from a next remaining component at the end of one or more predetermined time periods, wherein said component barcode information includes at least a batch number portion and a serial number portion;

barcode information storing program code means for causing said computer to effect storing of said barcode information;

usage determining program code means for causing said computer to effect calculating said quantity of components withdrawn from said component batch during each of said one or more predetermined time periods.

15. The program product of claim 14 wherein said computer readable program code means further includes report generating program code means for causing said computer to effect generating at least one report for said component batch.

16. The program product of claim 15 wherein said barcode information storing program code means further includes program code means for causing said computer to effect storing of multiple component batches.

17. An inventory usage recording system comprising:

optical reader means for scanning a component barcode tag of a designated component of a component batch containing a plurality of similar components wherein said component barcode tag includes at least a batch number portion and a serial number portion and wherein said plurality of similar components are arranged in numerical order according to said serial number portion;

processor means for receiving said component barcode tag, converting said component barcode tag into a digital tag representation, storing said digital tag representation into a memory means, and determining component batch usage from a difference between a first tag representation and a second tag representation wherein said second tag representation is a barcode tag from a next available component in said component batch after a predetermined usage time period wherein a quantity of said similar components have been withdrawn from said component batch; and graphical user interface means.

18. An inventory usage tracking system comprising:

a data input module capable of receiving the numbers of a component barcode of a designated component of a component batch wherein said component barcode includes at least a batch number portion and a serial number portion and wherein said plurality of similar components in said component batch are arranged in numerical order according to said serial number portion;

a controller module coupled to said input module, a converter circuit coupled to said controller module and said input module for receiving an input module signal, a data memory circuit coupled to said converter circuit, a data manipulation circuit coupled to said data memory circuit capable of performing various data manipulations, and a data display circuit coupled to said data manipulation circuit; and a component usage feedback module coupled to said controller module capable of displaying said data manipulations;

wherein said inventory system provides a usage quantity of said component batch by obtaining barcode numbers for a beginning item in said component batch and obtaining barcode numbers for the next available item in said component batch after a predetermined time of item usage or withdrawal of items from said component batch.

19. The inventory system of claim 18 further including a data recording module for recording said usage quantity of said component.

20. The inventory system of claim 18 wherein said input module, said controller module and said feedback module are combined into a single housing unit.

21. The inventory system of claim 20 wherein said single housing unit is a hand-held unit.

22. The inventory system of claim 18 wherein said component barcode number further includes a part number portion.

23. A method for measuring the quantity of components withdrawn from a component batch during a predetermined time period, said method comprising:

activating a component batch by inputting a component barcode number from a designated component in a component batch containing a plurality of similar components wherein said component barcode number includes at least a batch number portion and a serial number portion and wherein said plurality of similar components in said component batch are arranged in numerical order according to said serial number portion;

storing said at least batch number portion and said serial number portion of said component barcode number;

inputting a component barcode number of a next remaining component in said component batch after a predetermined usage time period;

calculating a usage quantity of said component by the difference between said serial number portion of said designated component and said serial number portion of said next remaining component; and displaying said usage quantity of said component for said predetermined time period.

24. The method of claim 23 wherein said storing step further includes storing the price of said component.

25. The method of claim 23 wherein said storing step further includes storing the date of said activating step.

26. The method of claim 23 wherein said scanning step further includes storing said component barcode number of said next remaining component.

27. The method of claim 26 further comprising determining when said component batch is empty.

28. A computer program product comprising:

a computer usable medium having computer readable program code means embodied therein for determining the quantity of components withdrawn from a component batch during a predetermined time period using an input component coupled to a computer, said computer readable program code means comprising:

input receiving program code means for causing said computer to effect receiving barcode number information from a designated component barcode number at the beginning of a component batch and for causing the computer to effect receiving barcode number information from a next remaining component at the end of one or more predetermined time periods, wherein said component barcode number information includes at least a batch number portion and a serial number portion;

barcode number information storing program code means for causing said computer to effect storing of said barcode number information;

usage determining program code means for causing said computer to effect calculating said quantity of components withdrawn from said component batch during each of said one or more predetermined time periods.

29. The program product of claim 28 wherein said computer readable program code means further includes report generating program code means for causing said computer to effect generating at least one report for said component batch.

30. The program product of claim 29 wherein said barcode number information storing program code means further includes program code means for causing said computer to effect storing of multiple component batches.

31. An inventory usage recording system comprising:

input means for inputting a component barcode tag number of a designated component of a component batch containing a plurality of similar components wherein said component barcode tag number includes at least a batch number portion and a serial number portion and wherein said plurality of similar components are arranged in numerical order according to said serial number portion;

processor means for receiving said component barcode tag number, converting said component barcode tag number into a digital tag representation, storing said digital tag representation into a memory means, and determining component batch usage from a difference between a first tag representation and a second tag representation wherein said second tag representation is a barcode tag number from a next available component in said component batch after a predetermined usage time period wherein a quantity of said similar components have been withdrawn from said component batch; and graphical user interface means.

* * * * *